US005637338A

United States Patent [19]
Van Aalst et al.

[11] Patent Number: 5,637,338
[45] Date of Patent: Jun. 10, 1997

[54] MODIFICATION OF EDIBLE OIL FLAVOR

[75] Inventors: Gerardus M. Van Aalst, Hellevoetsluis; Cornelis Hofman, Oostvoorne; Marcho S. Kouumdjiev, Vlaardingen; Adrianus J. Kuin, Schiedam; Karel P. Van Putte, Maasland, all of Netherlands

[73] Assignee: Unilever Patent Holdings BV, Vlaardingen, Netherlands

[21] Appl. No.: 491,958

[22] PCT Filed: Jan. 6, 1994

[86] PCT No.: PCT/EP94/00024

§ 371 Date: Sep. 7, 1995

§ 102(e) Date: Sep. 7, 1995

[87] PCT Pub. No.: WO94/15479

PCT Pub. Date: Jul. 21, 1994

[30] Foreign Application Priority Data

Jan. 18, 1993 [EP] European Pat. Off. ............... 93200112

[51] Int. Cl.$^6$ .................................................. A23L 1/015
[52] U.S. Cl. ...................... 426/417; 426/312; 426/487; 426/534; 426/601; 554/184; 554/205
[58] Field of Search .................................. 426/312, 417, 426/487, 488, 534, 601; 554/175, 184, 205

[56] References Cited

U.S. PATENT DOCUMENTS 3,933,953  1/1976  Leva .................................. 426/488 X
5,091,116  2/1992  Krishnamurthy et al. .......... 426/417 X
5,116,625  5/1992  Patel et al. ............................ 426/3
5,374,751  12/1994  Cheng et al. ....................... 426/417 X

FOREIGN PATENT DOCUMENTS

0405601A2  1/1991   European Pat. Off. ........... C11B 3/14
0475573A1  3/1992   European Pat. Off. ........... A23D 9/00
0513739A2  11/1992  European Pat. Off. ........... C11B 3/14
1445240    5/1966   France .
62-6651    1/1987   Japan .
2231252    11/1990  United Kingdom .......... A23L 3/3418
WO93/19626 10/1993  WIPO ........................... A23L 2/18

OTHER PUBLICATIONS

Chemical Abstracts, vol. 107, No. 7, Aug. 7, 1987, Abstract No. 57646x.

Chemical Abstracts, vol. 98, No. 15, Apr. 11, 1983, Abstract No. 124431j.

Derwent Publications, Ltd., London, GB, AN 840125279 (Aug. 1983).

*Primary Examiner*—Milton Cano
*Attorney, Agent, or Firm*—Cushman Darby & Cushman IP Group Pillsbury Madison & Sutro LLP

[57] ABSTRACT

A useful method for shifting the flavour balance of edible oils comprises sparging nitrogen through the oil at a temperature of 20°–65° C. Olive oil is preferably treated at 30°–40° C. The treatment may be combined with usual purification steps as are washing and filtration over a filter aid.

9 Claims, 4 Drawing Sheets

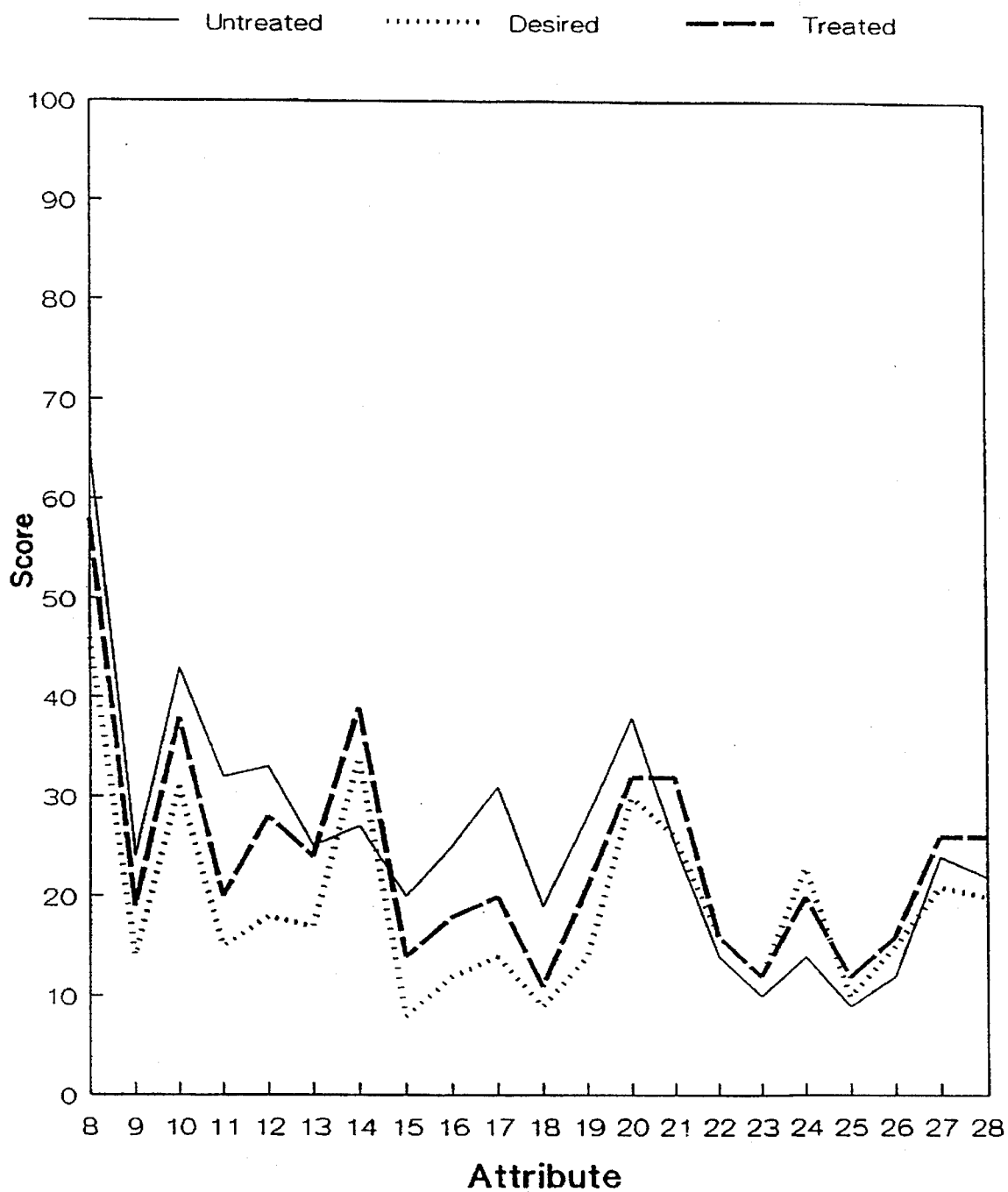

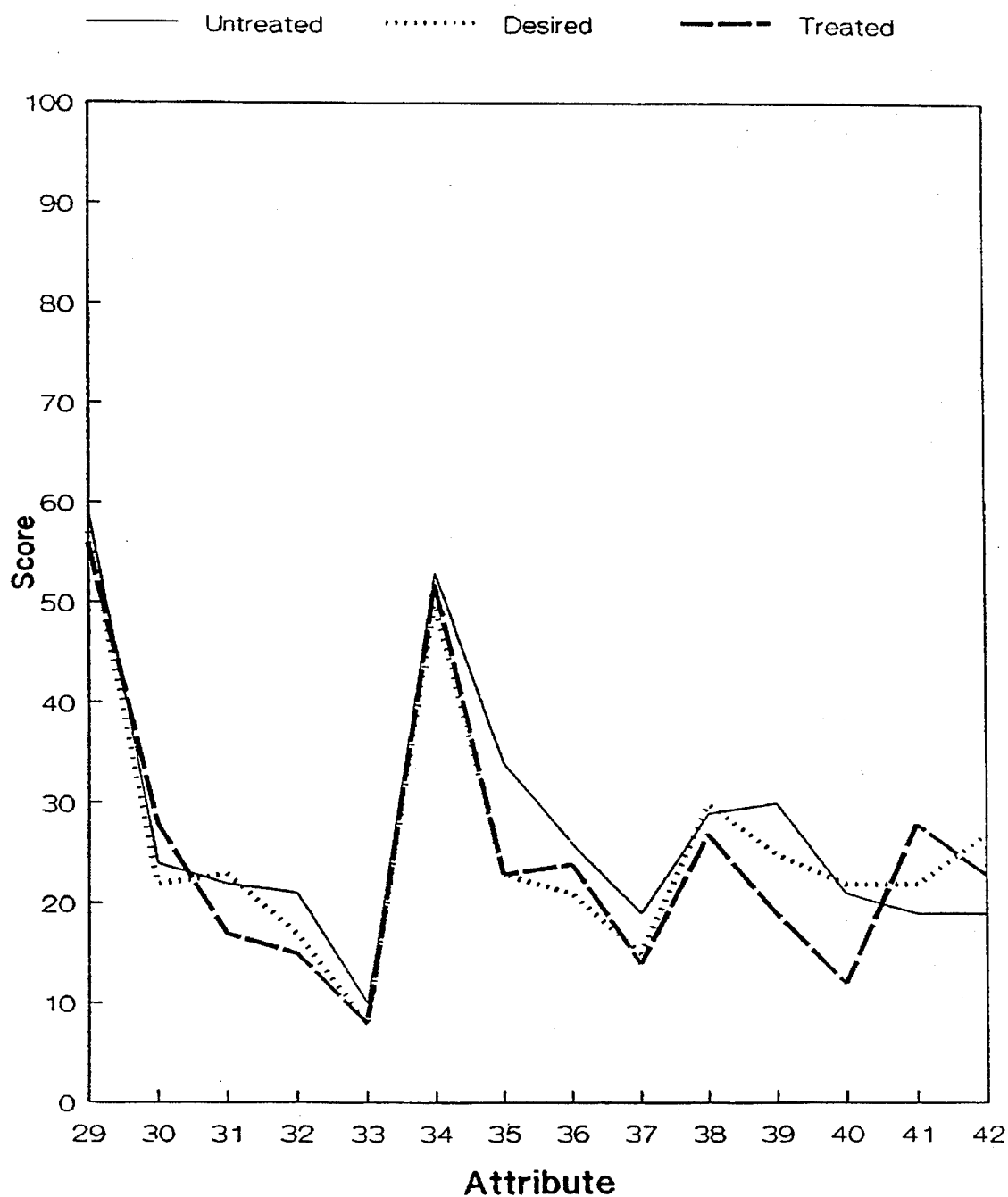

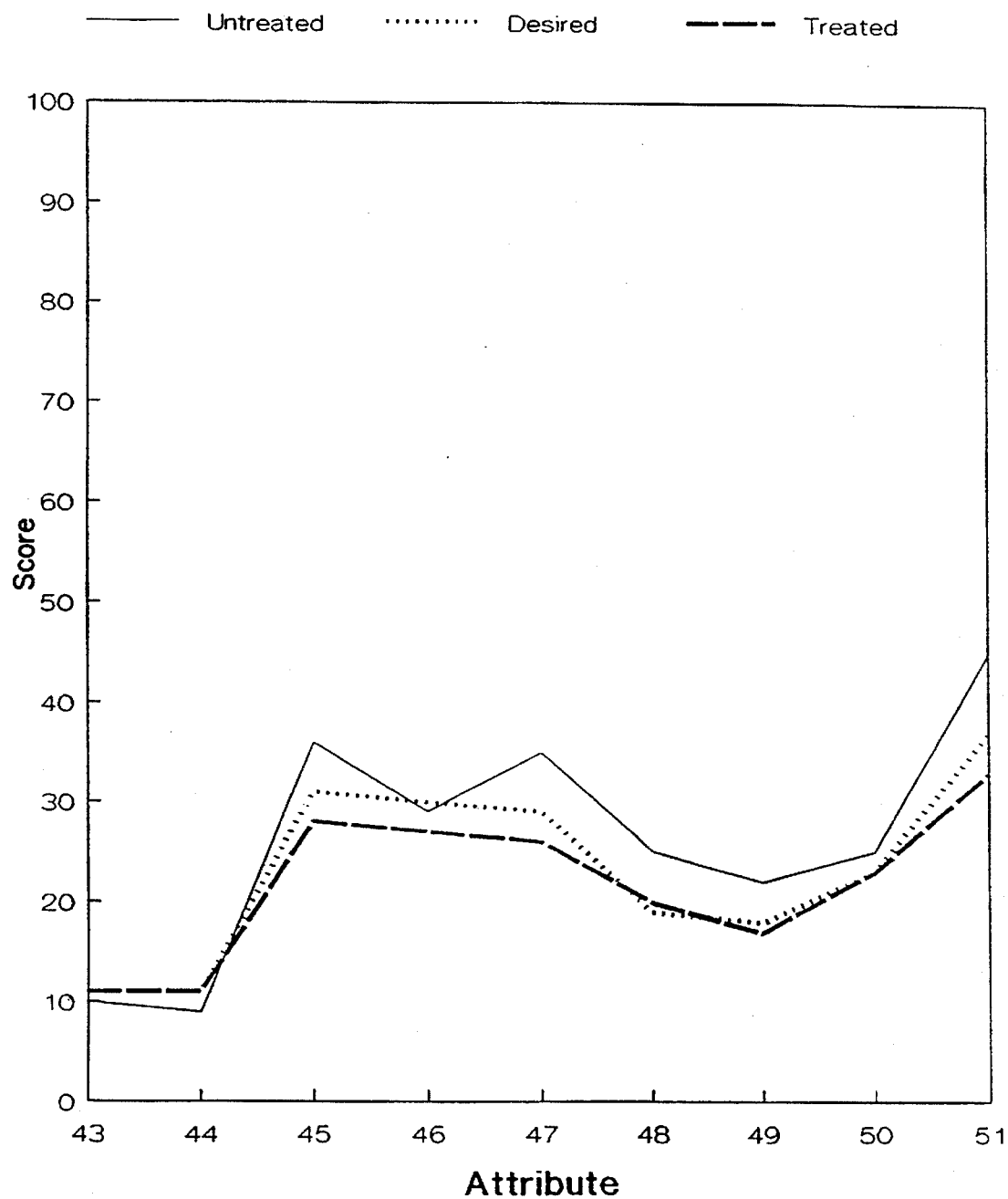

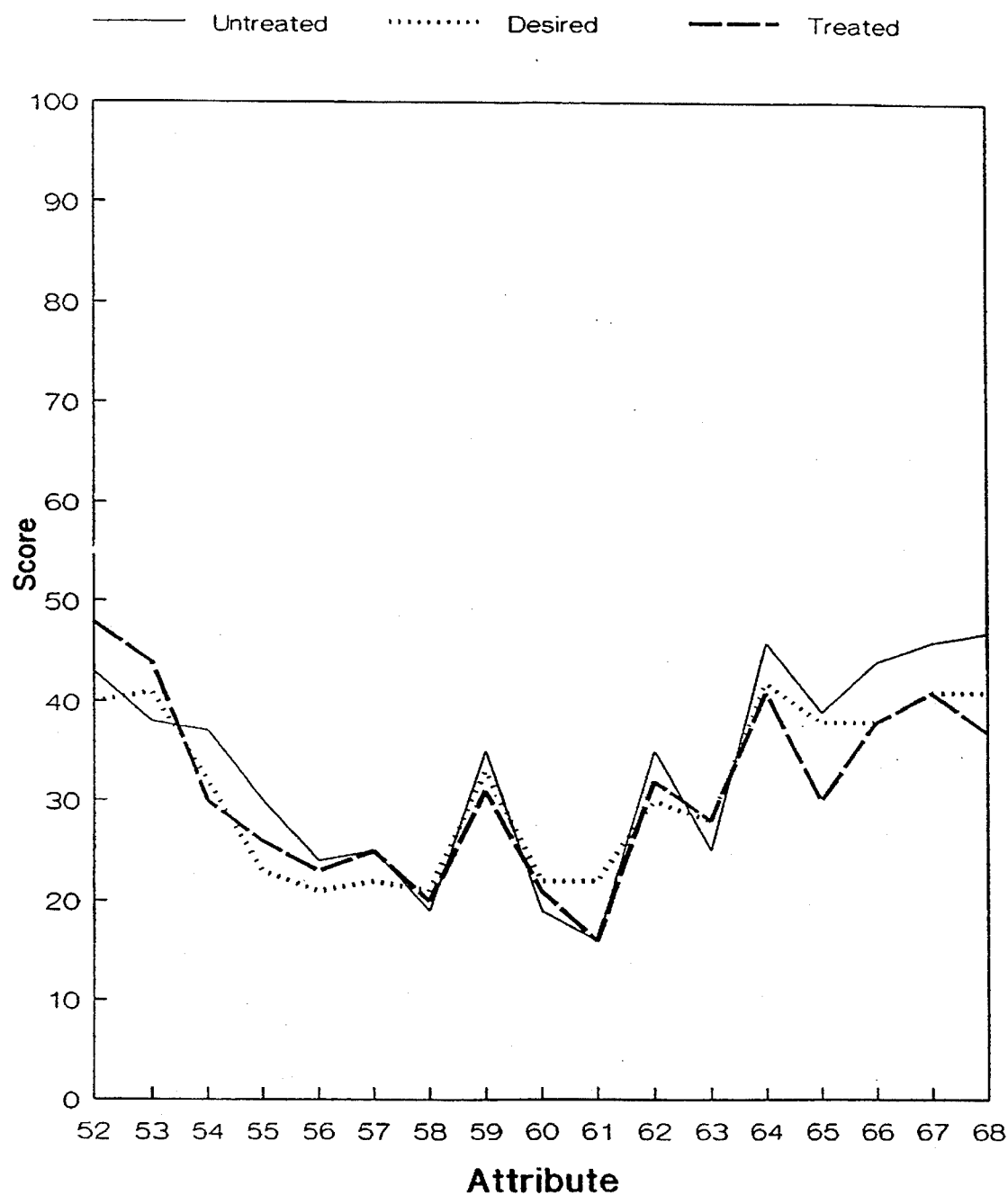

MODIFICATION OF EDIBLE OIL FLAVOR

The present invention is concerned with a method for treating edible oil, particularly olive oil. Olive oil is offered on the market in a range of qualities and tastes. Olive oil of good quality is characterized by a fragrant and delicate flavour which is appreciated by the international gourmet and cherished by the native consumer. Even good quality olive oils widely vary in their flavour balance analogous to the multitude of wine varieties. The best quality olive oils are found in the group named virgin olive oils. The taste of olive oil may vary widely and is partly determined by the origin of the olive culture. The taste may, for example, be influenced by the composition of the soil. An oil from one region may have a taste quite different from a neighbouring region. On account of yearly differences in harvest yields shortages may arise of specific types of olive oil. A shortage in one region or country might be easily compensated by a greater supply in another region or country, if not barriers would exist which are caused by consumers flavour appreciation. Some high quality oils have a peculiar flavour which may not be appreciated by consumers who are not accustomed to that flavour.

Therefore a need exists for a method which allows a slight shift in the flavour balance of olive oil. A known method for influencing the flavour of edible oils is sparging them with steam or an inert gas, generally with nitrogen. However, for obtaining sufficient odour removal high temperatures, at least 180° C. are applied. In EP 0 405 601 a method is given for deodorising olive oil by sparging nitrogen through olive oil heated at a temperature of at least 180° C. Such treatments are aimed at removing all volatile odiferous substances. Even flavour components which are appreciated disappear under such relatively drastic conditions. In EP 0 475 573 a method is given for transferring attractive flavour components from one oil, a so-called flavorant oil, to another recipient oil. An inert gas such as nitrogen is conducted through the flavorant oil, which is heated to temperatures of at least 65.6° C. While the flavorant oil gets exhausted the inert gas loaded with flavour components is conducted through a relatively cooler oil which absorbs the flavour components from the flavour loaded nitrogen.

SUMMARY OF THE DESCRIPTION

The above mentioned prior art methods are rather intruding and are primarily directed to the removal of flavours. A less fragrant oil is left behind. However, now a method has been found for treating an edible oil, particularly olive oil. This treatment causes in a mild and delicate way a slight shift in the flavour balance which might be perceived as attractive. The method comprises conducting under reduced pressure inert gas through the oil, provided the temperature is maintained at very moderate levels being 20–65° C. The use of the invention results in an oil which in comparison with the source oil has a slightly shifted flavour balance and which appeals to another and often a larger group of consumers.

BRIEF DESCRIPTION OF THE DRAWINGS

FIGS. 1–4 represent sensory profile graphs illustrating the flavour balance feature of the invention.

DETAILS OF THE INVENTION

The oil which is subjected to the mild treatment of the invention, might be any edible oil with a flavour, particularly oils which derive their commercial value from an appreciated flavour. A preferred oil is olive oil, more particularly an olive oil from southern Spain with a characteristic strong flavour.

In this context a mild treatment is conceived to be a non-intrusive treatment which does not alter the molecular structure of the oil and which does not expose the oil to chemical or to extreme physical conditions such as temperatures over 100° C.

The invention relates to a process comprising sparging an edible oil with an inert gas, preferably under reduced pressure, particularly 1–20 mbar and more preferably 5–18 mbar.

The inert gas might be any inert gas such as e.g. helium, but preferably is nitrogen. A suitable amount of nitrogen is 0.1–25 $m^3$ of nitrogen per kg of oil. Volumes are to be measured under the pressure to which the oil is exposed. The sparging treatment is carried out at 20–65° C., and preferably at 55–65° C. When treating olive oil a temperature is observed which preferably is 30–40C. The optimum sparging time for obtaining the desired flavour effect should be established from case to case. When the treatment proceeds, a gradual shift of the flavour balance can be observed. An optimum combination of time, pressure and temperature can be easily found by observation of this flavour shift. In general a suitable sparging time can be found in the range of 0.5–10 hours and preferably is 1–5 hours. Obviously the longer times are necessary when the sparging temperature is relatively low. The inert gas treatment may be combined with other oil treatments such as washing with water and/or a filtration step preceding or following the sparging treatment. It is particularly advantageous to have the olive oil filtered through a filter aid, such as Lignocell™ or Hyflo™.

The described invention provides a useful method for shifting the flavour balance of olive oils. It enables an adaptation of the flavour to varying consumer wishes. This method may increase the flexibility of the market for olive oils. The invented treatment is remarkably mild and sparing for the oil, so that it may comply with trade regulations for olive oil processing.

For the identification of edible oils which have been subjected to the treatment of the invention use can be made of the contents of octanol-1 and hexanol-1 both being usual components of edible oils. Before treatment these alcohols are present in concentrations of which the ratio [octanol-1] : [hexanol-1] is lower than 0.5. Sparging the oil according to the invention partly removes both octanol-1 and hexanol-1, but the more volatile hexanol-1 to a greater extent, which causes an upward shift in the ratio [octanol-1] : [hexanol-1]. Therefore the invention is also embodied in an edible oil, preferably olive oil, containing octanol-1 and hexanol-1, characterised in that the ratio of the octanol-1 and hexanol-1 concentrations is higher than 1, preferably higher than 5.

EXAMPLE 1

SPARGING OF OLIVE OIL WITH NITROGEN

Filtered Andalusian olive oil was washed 6 times with 10 wt.% of water of 40° C. The mixture was subsequently centrifuged and dried at 40° C. and at 200 mbar for 30 minutes while being stirred with a tipspeed of 2.45 m/s. Then 0.2% of Hyflo™ was added. The oil was left for 10 minutes at 40° C. and at 800 mbar while being stirred with a tip speed of 2.45 m/s. The filtration was carried out at 3 bar overpressure. The oil was then sparged with 15 m³ of nitrogen per kg of oil for 90 minutes at 40° C. and at 7 mbar.

| Concentration | octanol-1 (O) | hexanol-1 (H) | Ratio O/H |
|---|---|---|---|
| Before sparging | 138 | 348 | 0.4 |
| After sparging | 97 | 11 | 8 |

EXAMPLE 2

SENSORY APPRAISAL OF TREATED OLIVE OIL

To a trained panel of 15 persons three olive oils A, B and C were submitted for sensory appraisal.

Oil A is a filtered Andalusian olive oil.

Oil B is obtained by subjecting oil A to a further treatment comprising the process, as described in detail in example 1 including sparging with nitrogen.

Oil C is a marketed olive oil selected because it has a flavour balance which is considered a desired target. The panel assessed the three oils. Scores were given for sensory properties comprising 61 attributes divided over the categories Smell, Odour, Mouthfeel, Taste and Aftertaste (collected in Table 1). The flavour balance (sensory profile) has been graphically visualised by connecting the scores of each attribute, resulting in a sensory profile graph (see FIGS. 1–4). The sensory profiles for oil A (Untreated), oil B (Treated) and C (Desired) are depicted in the same figure for comparison purposes. The overall impression according to the panel was that oil B had a taste which was very much alike those of oil C. In contrast untreated oil A was clearly perceived different from oil C. This overall impression was confirmed by the appraisal of the specific sensory attributes. The graphs of FIGS. 1–4 clearly show that the nitrogen treatment had a positive influence on the sensory profile of the source oil and has caused a shift into the direction of the desired olive oil flavour balance.

TABLE 1

| Number | Flavour and sensory attributes |
|---|---|
| | Smell |
| (1–7 | not relevant for the purpose) |
| 8 | odour intensity |
| 9 | sea breeze on the beach |
| 10 | prickling |
| 11 | apple |
| 12 | twig |
| 13 | pine/harshy |
| 14 | dry wood |
| 15 | lemon |
| 16 | orange |
| 17 | soft fruit (straw, raspberry) |
| 18 | candies (fruit) |
| 19 | wild flowers in spring |
| 20 | fermenting fruit |

TABLE 1-continued

| Number | Flavour and sensory attributes |
|---|---|
| 21 | farm |
| 22 | oil for salads (bean oil) |
| 23 | tallow |
| 24 | rancid |
| 25 | cod liver oil |
| 26 | nuts |
| 27 | medicin |
| 28 | earthy |
| | taste |
| 29 | taste intensity |
| 30 | sweet |
| 31 | sally |
| 32 | sour |
| 33 | vinegar |
| 34 | olives |
| 35 | green leaf |
| 36 | grass |
| 37 | green banana (not ripe) |
| 38 | dried green herbes |
| 39 | grounded pepper (b/w) |
| 40 | red chili pepper |
| 41 | cream/butter |
| 42 | rancid |
| 43 | cocos |
| 44 | caramel |
| 45 | grotty |
| 46 | slightly burned/taste |
| 47 | ash tray |
| 48 | velpon (glue with ethylacetate) |
| 49 | refinery |
| 50 | metallic |
| 51 | bitter |
| | mouthfeel |
| 52 | velvet like |
| 53 | sticky |
| 54 | astringent |
| | aftertaste |
| 55 | green |
| 56 | fruity |
| 57 | velpon (see above) |
| 58 | cocoa butter/white choc. |
| 59 | putty/linseed oil |
| 60 | used frying oil |
| 61 | trany |
| 62 | dry wood |
| 63 | dusty |
| | after mouthfeel |
| 64 | cooling/evaporating |
| 65 | rough |
| 66 | dry |
| 67 | sharp/etching |
| 68 | pungent |

We claim:

1. A method for shifting the flavour balance of olive oil containing an octanol-1 to hexanol-1 concentrations ratio lower than 0.5 prior sparging comprising the step of:

sparging the oil with an inert gas at a temperature of 20°–65° C. to remove octanol-1 and hexanol-1 to thereby increase the octanol-1 to hexanol-1 concentrations ratio to higher than 1.

2. Method according to claim 1, wherein the inert gas in nitrogen.

3. Method according to claim 1 wherein the temperature is 55°–65° C.

4. Method according to claim 3 wherein the temperature is 30°–40° C.

5. Method according to claim 1 wherein 0.1–25 m$^3$ of nitrogen per kg of oil is used for sparging.

6. Method according to claim 1 wherein the sparging treatment is combined with a washing treatment and/or a filtration with a filter aid.

7. Method according to claim 1 wherein the treatment is carried out at reduced pressure of 5–18 mbar.

8. Olive oil containing octanol-1 and hexanol-1, wherein the ratio of the octanol-1 and hexanol-1 concentrations is higher than 1.

9. Edible oil according to claim 8, wherein the ratio is higher than 5.

* * * * *